US012410717B2

(12) United States Patent
Lee

(10) Patent No.: US 12,410,717 B2
(45) Date of Patent: Sep. 9, 2025

(54) GAS TURBINE BLADE WITH COOLING FLOW PATHS AND GAS TURBINE INCLUDING THE SAME

(71) Applicant: DOOSAN ENERBILITY CO., LTD., Changwon (KR)

(72) Inventor: Ki Don Lee, Gimhae (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 64 days.

(21) Appl. No.: 18/536,415

(22) Filed: Dec. 12, 2023

(65) Prior Publication Data

US 2024/0309766 A1 Sep. 19, 2024

(30) Foreign Application Priority Data

Mar. 17, 2023 (KR) ........................ 10-2023-0034952

(51) Int. Cl.
*F01D 5/18* (2006.01)
*F01D 9/04* (2006.01)
*F01D 25/12* (2006.01)

(52) U.S. Cl.
CPC ............. *F01D 5/186* (2013.01); *F01D 9/041* (2013.01); *F01D 25/12* (2013.01); *F05D 2240/35* (2013.01); *F05D 2260/201* (2013.01)

(58) Field of Classification Search
CPC .......... F01D 5/186; F01D 9/041; F01D 25/12; F01D 9/065; F01D 5/187; F05D 2240/35;
(Continued)

(56) References Cited

U.S. PATENT DOCUMENTS 7,513,739 B2 * 4/2009 Boury ..................... F01D 5/187
415/115
8,202,054 B2 6/2012 Liang
(Continued)

FOREIGN PATENT DOCUMENTS

JP 2004-293557 A 10/2004
JP 4846668 B2 12/2011
(Continued)

OTHER PUBLICATIONS

Office Action issued by the Korean Patent Office dated Feb. 21, 2025.

*Primary Examiner* — Courtney D Heinle
*Assistant Examiner* — Andrew Thanh Bui
(74) *Attorney, Agent, or Firm* — Harvest IP Law, LLP

(57) ABSTRACT

The present invention relates to a turbine blade for a gas turbine, and one aspect of the present invention provides a blade for a gas turbine, the blade including a blade body portion having a leading edge and a trailing edge respectively disposed at an upstream side and a downstream side based on a flow direction of a working fluid, a cooling airflow path disposed in the blade body portion and configured to provide a flow path for cooling air, inflow paths configured to communicate with the cooling airflow path, outflow paths through which the cooling air is injected toward the trailing edge, and a communication chamber, located between the inflow paths and the outflow paths, configured to allow communication between the inflow paths and the outflow paths, in which the inflow paths and the outflow paths are positioned offset in a radial direction of the blade body portion.

19 Claims, 11 Drawing Sheets

(58) Field of Classification Search
CPC ......... F05D 2260/201; F05D 2240/304; F05D 2260/2212; F05D 2260/202
See application file for complete search history.

(56) References Cited

U.S. PATENT DOCUMENTS

| | | | | |
|---|---|---|---|---|
| 11,732,594 | B2 * | 8/2023 | Rathay | F01D 9/065 416/97 R |
| 2008/0286115 | A1 | 11/2008 | Liang | |
| 2012/0269649 | A1 * | 10/2012 | Rawlings | F01D 5/187 416/97 R |
| 2018/0230815 | A1 * | 8/2018 | Jones | F01D 9/065 |
| 2018/0283183 | A1 * | 10/2018 | Gallier | F01D 9/04 |

FOREIGN PATENT DOCUMENTS

| | | | |
|---|---|---|---|
| KR | 10-1464988 | B1 | 11/2014 |
| KR | 10-2488973 | B1 | 1/2023 |

* cited by examiner

GAS TURBINE BLADE WITH COOLING FLOW PATHS AND GAS TURBINE INCLUDING THE SAME

CROSS REFERENCE TO RELATED APPLICATION

The present application claims priority to Korean Patent Application No. 10-2023-0034952, filed on Mar. 17, 2023, the entire contents of which are incorporated herein for all purposes by this reference.

BACKGROUND OF THE INVENTION

Field of the Invention

The present invention relates to a turbine blade for a gas turbine, and more particularly, to a cooling structure for cooling a trailing edge of a turbine blade.

Description of the Related Art

A turbine engine refers to a mechanical device that obtains a rotational force from an impact force or reaction force by using a flow of a compressible fluid such as steam and gas. The turbine engines are classified into a steam turbine using steam, and a gas turbine using high-temperature combustion gas.

In the typical configuration of a gas turbine, the gas turbine generally includes a compressor, a combustor, and a turbine. The compressor has an air inlet into which air is introduced, and a plurality of compressor vanes and a plurality of compressor blades are alternately disposed in a compressor casing. The air introduced from the outside is gradually compressed while passing through the compressor blades that are disposed at multiple stages and rotate, such that a pressure of the air is raised to a target pressure.

The combustor produces high-temperature, high-pressure combustion gas by supplying fuel to the compressed air compressed by the compressor and igniting the fuel by using a burner.

The turbine includes a plurality of turbine vanes and a plurality of turbine blades that are alternately disposed in a turbine casing. In addition, a rotor is disposed to penetrate the compressor, the combustor, the turbine, and a central portion of an exhaust chamber.

Two opposite ends of the rotor are rotatably supported by bearings. Further, a plurality of discs is fixed to the rotor, and the blades are respectively connected to the discs, and a driving shaft of an electric generator is connected to an end of the rotor adjacent to the exhaust chamber.

Because the gas turbine does not have a reciprocating mechanism similar to a piston of a four-stroke engine, the gas turbine does not have mutual friction parts similar to the piston and a cylinder. Therefore, the gas turbine has an advantage in that the gas turbine consumes an extremely small amount of lubricating oil, an amplitude, which is one of the characteristics of the reciprocating mechanism, is significantly reduced, and the gas turbine may operate at high speed.

An operation of the gas turbine will be briefly described. The air compressed by the compressor is mixed with fuel and combusted, resulting in producing high-temperature combustion gas, and the combustion gas produced as described above is injected into the turbine. The injected combustion gas generates a rotational force while passing through the turbine vanes and the turbine blades, thereby causing the rotor to rotate.

Various factors affect the efficiency of the gas turbine. Recently, various studies have been conducted to develop the gas turbine in order to improve combustion efficiency in the combustor, improve thermodynamic efficiency by raising a turbine inlet temperature, and improve aerodynamic efficiency in the compressor and the turbine.

The classification of industrial gas turbines for power generation may be based on turbine inlet temperatures (TITs). G-class and H-class gas turbines currently lead in the industry. There is also an example in which the most recent gas turbine reaches class J. As the class of the gas turbine increases, both the efficiency and the turbine inlet temperature increase. Because a turbine inlet temperature of the H-class gas turbine is up to 1,500° C., there is a need to develop heat-resistant materials and cooling technologies to that extent.

Heat-resistant design is required for the entire gas turbine and is especially important in the combustor and the turbine in which the high-temperature combustion gas is produced and flows. The gas turbine is cooled in an air-cooled manner using the compressed air produced by the compressor as cooling air. The efficient cooling design for the turbine is challenging to implement because of the complicated structure in which the turbine vanes are fixedly disposed between the turbine blades that rotate over several stages.

In particular, because the turbine blade is a component that rotates under a high-temperature, high-pressure environment, the turbine blade is one of the components that are most frequently damaged. Among other things, a trailing edge of the turbine blade having an air foil shape has a small thickness, which makes it difficult to supply a sufficient amount of cooling fluid. Further, the trailing edge is a thermally and structurally weak part because the trailing edge causes a fluctuation in a pressure field caused by external shock and wakes. In addition, in case when a cooling flow path is provided in the trailing edge, the thickness of the trailing edge increases, which results in an aerodynamic loss caused by the occurrence of wakes.

As described above, there are various constraints in achieving both sufficient cooling performance and aerodynamic performance related to the trailing edge of the turbine blade. Accordingly, there is a need to develop a new trailing edge cooling structure capable of coping with the constraints.

SUMMARY OF THE INVENTION

The present invention is proposed to solve these problems and aims to provide a gas turbine blade capable of further improving performance in cooling a trailing edge.

In order to solve the technical problem, the present invention provides a blade for a gas turbine, the blade including: a blade body portion having a leading edge and a trailing edge respectively disposed at an upstream side and a downstream side based on a flow direction of a working fluid; a cooling airflow path disposed in the blade body portion and configured to provide a flow path for cooling air; inflow paths configured to communicate with the cooling airflow path; outflow paths through which the cooling air is injected toward the trailing edge; and a communication chamber, located between the inflow paths and the outflow paths, configured to allow communication between the inflow paths and the outflow paths, in which the inflow paths and the outflow paths are positioned offset in a radial direction of the blade body portion.

The communication chamber may extend in the radial direction of the blade body portion, and the inflow paths and the outflow paths may communicate with the communication chamber. According to an embodiment, the blade body portion may have only one communication chamber, or may have a plurality of communication chambers disposed serially along the blade body portion.

In addition, the inflow paths may configured to exclusively receive the cooling air from the cooling airflow path. According to an embodiment, the cooling airflow paths may receive the cooling air from multiple cooling airflow paths.

When the flow direction of the working fluid is along an axial direction of the gas turbine, the inflow paths and the outflow paths may be positioned offset in the radial direction so as not to overlap each other when viewed in an axial direction of the gas turbine.

In addition, the blade may further include: a communication chamber located downstream of and connected to the outflow paths; and auxiliary outflow paths, located downstream of and connected to the auxiliary communication chamber, configured to inject cooling air toward the trailing edge, wherein the outflow paths, wherein the outflow paths are configured to allow the adjacent communication chambers to communicate with one another.

The outflow paths and the auxiliary outflow paths may be positioned offset in the radial direction of the blade body.

In addition, the communication chamber may have a constant width, defined in a circumferential direction, constant along the flow direction of the working fluid. In some instances, the communication chamber may have a tapered shape having a width, defined in a circumferential direction, that decreases along the flow direction of the working fluid.

Another aspect of the present invention provides a rotor for a gas turbine, the rotor including: rotor discs fixed to a rotary shaft of the gas turbine; and blades radially inserted into outer peripheral portions of the rotor discs, in which each of the blades may be one of the above-mentioned blades.

Still another aspect of the present invention provides a gas turbine including: a housing; a compressor section disposed at an upstream side in the housing; a turbine section disposed at a downstream side in the housing; and a combustor configured to combust a gas mixture of compressed air and fuel supplied from the compressor section and supply the combustion gas to the turbine section, in which at least one of the compressor section and the turbine section may include a rotor as the one above described.

DETAILED DESCRIPTION OF THE INVENTION

Figure 1:
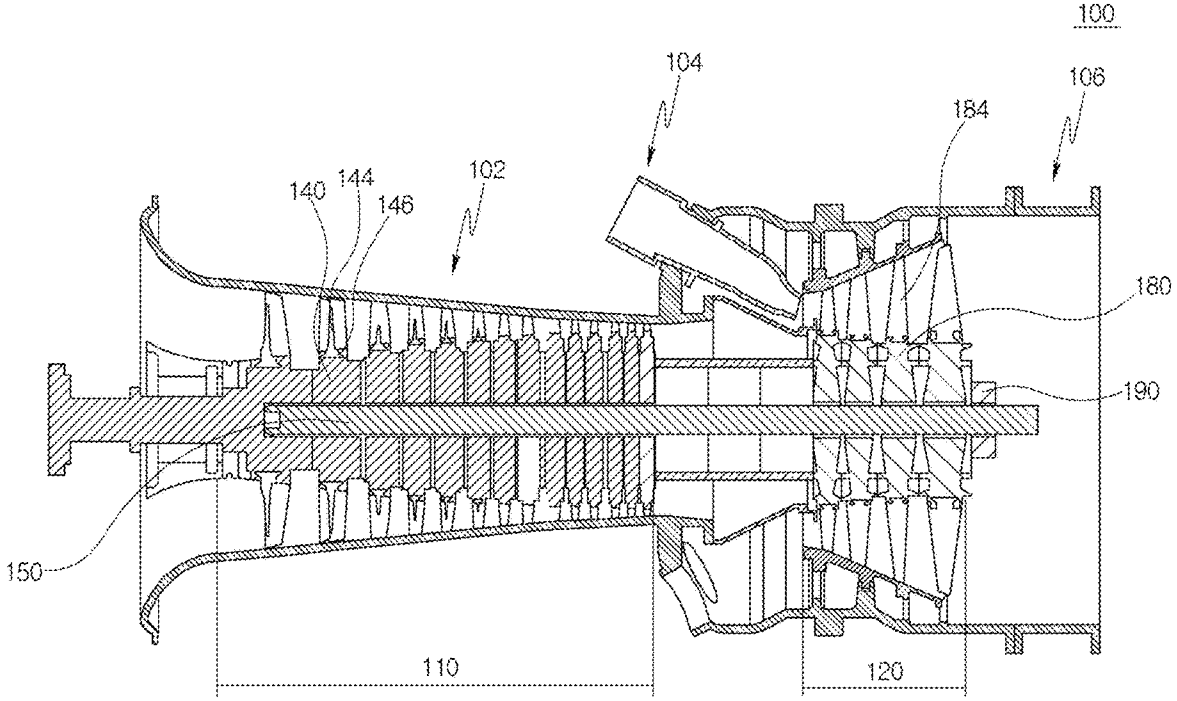
FIG. 1 is a cross-sectional view schematically illustrating an internal structure of a gas turbine.

Hereinafter, exemplary embodiments of the present invention will be described in detail with reference to the accompanying drawings. It should be noted that the same constituent elements will be designated by the same reference numerals in the accompanying drawings. Further, detailed descriptions of publicly-known functions and configurations, which may obscure the subject matter of the present invention, will be omitted. Similarly, in the accompanying drawings, some constituent elements are illustrated in an exaggerated or schematic form or are omitted.

FIG. 1 illustrates an example of a gas turbine 100 to which the embodiment of the present invention is applied. The gas turbine 100 has a housing 102. A diffuser 106 is provided rearward of the housing 102 and discharges combustion gas having passed through the turbine. Further, a combustor 104 is disposed forward of the diffuser 106 and receives and combusts compressed air.

The description will be made based on a flow direction of air. A compressor section 110 is positioned at an upstream side of the housing 102, and a turbine section 120 is disposed at a downstream side of the housing 102. Further, a torque tube 130 is disposed between the compressor section 110 and the turbine section 120 and serves as a torque transmission member for transmitting rotational torque, which is generated in the turbine section, to the compressor section.

A plurality of (e.g., fourteen) compressor rotor discs 140 is provided in the compressor section 110, and the compressor rotor discs 140 are fastened to one another by a tie rod 150 so as not to be spaced apart from one another in an axial direction.

Specifically, the compressor rotor discs 140 are aligned with one another in the axial direction in a state in which the tie rod 150 penetrates approximately centers of the compressor rotor discs 140. In this case, the surfaces of the adjacent compressor rotor discs 140, which face one another, are compressed by the tie rod 150, such that the adjacent compressor rotor discs 140 are disposed so as not to rotate relative to one another.

A plurality of blades 144 is radially coupled to outer peripheral surfaces of the compressor rotor discs 140. The blades 144 respectively have root portions 146 fastened to the compressor rotor discs 140. In this case, the rotor discs and the plurality of blades may be collectively called a rotor.

Vanes (not illustrated) fixedly disposed on the housing are positioned between the rotor discs 140. Unlike the rotor discs, the vanes are fixed and do not rotate. The vanes serve to align flows of the compressed air having passed over the blades of the compressor rotor discs and guide the air to the blades of the rotor discs positioned at the downstream side.

Methods of fastening the root portion 146 are classified into a tangential type method and an axial type method. The method may be selected depending on a necessary structure of a commercially available gas turbine, and the structure may have a dove-tail shape or a fir-tree shape that is typically known. In some instances, the blade may be fastened to the rotor disc by using a fastening device other than the above-mentioned component, for example, by using a fixture such as a key or a bolt.

The tie rod 150 is disposed to penetrate central portions of the plurality of compressor rotor discs 140. One end of the tie rod 150 is fastened to the compressor rotor disc positioned at the most upstream side, and the other end of the tie rod 150 is fixed to the torque tube 130.

The tie rod 150 may have various structures depending on the gas turbine, and the shape of the tie rod 150 is not necessarily limited to the shape illustrated in FIG. 1. That is, as illustrated, the single tie rod may penetrate the central portions of the rotor discs, or a plurality of tie rods may be disposed on circumferences of the rotor discs. The above-mentioned configurations may be interchangeable.

Although not illustrated, in the compressor of the gas turbine, vanes may be installed at positions positioned rearward of the diffuser and serve as guide feathers for setting a flow angle of a fluid, which is introduced into a combustor inlet after raising a pressure of the fluid, to a designed flow angle. The vanes are called de-swirlers.

The combustor 104 produces high-temperature, high-pressure combustion gas with high energy by mixing the introduced compressed air with fuel and combusting the fuel, thereby performing an isobaric combustion process that raises a temperature of the combustion gas to a heat resistance limit that the combustor and the turbine component may withstand.

The combustor, which constitutes a combustion system of the gas turbine, may be provided as a plurality of combustors arranged in a casing provided in the form of a cell. The combustor includes a burner having a fuel injection nozzle and the like, a combustor liner configured to define a combustion chamber, and a transition piece configured to serve as a connection portion between the combustor and the turbine.

Specifically, the liner provides a combustion space in which the fuel injected by the fuel nozzle is mixed with the compressed air from the compressor and combusted. The liner may include a flame container configured to provide the combustion space in which the fuel mixed with air is combusted, and a flow sleeve configured to form an annular space while surrounding the flame container. In addition, the fuel nozzle is coupled to a front end of the liner, and an igniter is coupled to a sidewall of the liner.

Meanwhile, the transition piece may be connected to a rear end of the liner to transmit the combustion gas toward the turbine. An outer wall portion of the transition piece is cooled by the compressed air supplied from the compressor to prevent damage caused by a high temperature of the combustion gas.

To this end, cooling holes are provided in the transition piece to inject air into the transition piece, and the compressed air cools a main body, which is disposed inward, through the holes and then flows toward the liner.

The cooling air, which has cooled the transition piece, flows in the annular space of the liner. The compressed air, which is provided outside the flow sleeve as cooling air through cooling holes provided in the flow sleeve, may collide with an outer wall of the liner.

Meanwhile, the high-temperature, high-pressure combustion gas discharged from the combustor is supplied to the turbine section 120. The supplied high-temperature, high-pressure combustion gas collides with rotary blades of the turbine while expanding and provides a reaction force to generate rotational torque. The obtained rotational torque is transmitted to the compressor section via the torque tube, and power, which exceeds power required to operate the compressor, is used to operate an electric generator or the like.

The turbine section is basically similar in structure to the compressor section. That is, a plurality of turbine rotor discs 180 similar to the compressor rotor discs in the compressor section is also provided in the turbine section 120. Therefore, the turbine rotor discs 180 also include a plurality of turbine blades 184 disposed radially. The turbine blades 184 may also be coupled to the turbine rotor discs 180 in a dove-tail manner or the like. Further, vanes (not illustrated) fixed to the housing are also provided between the blades 184 of the turbine rotor discs 180 and guide a flow direction of the combustion gas having passed over the blades.

Figure 2:
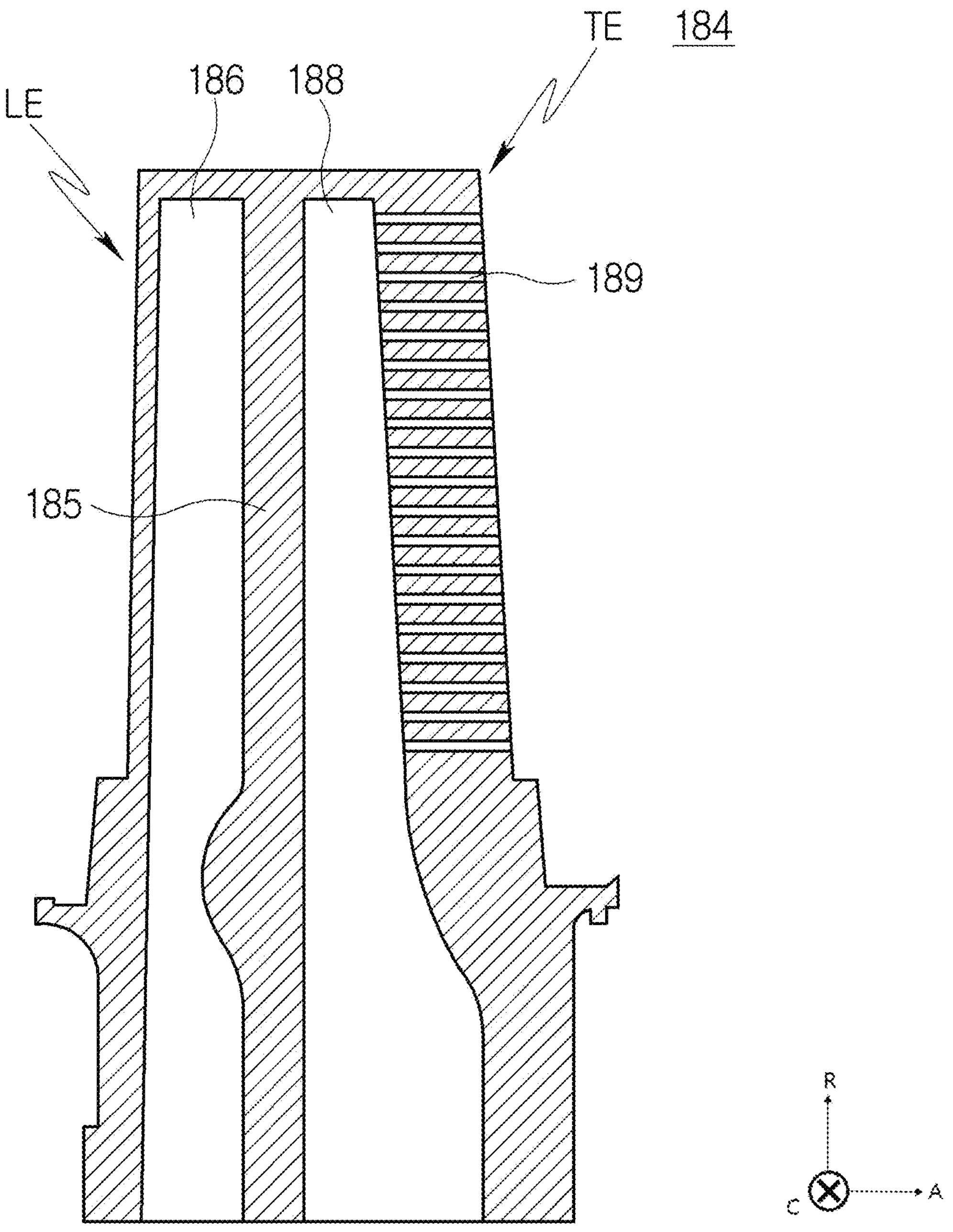
FIG. 2 is a cross-sectional view illustrating an interior of a conventional blade.

The blade 184 is a component directly exposed to the high-temperature combustion gas and includes a system for cooling, as described above. FIG. 2 illustrates an internal structure of the blade including a conventional cooling means.

With reference to FIG. 2, a plurality of cooling airflow paths 186 and 188 is provided in a blade body portion 185 of the blade 184, which has an airfoil shape capable of improving aerodynamic performance. The cooling airflow paths 186 and 188 are configured to guide a flow of cooling air extracted and supplied from the compressor section. FIG. 2 illustrates an example of when two flow paths 186 and 188 are disposed in parallel. More than two flow paths may be provided in a blade. The two flow paths may be separated from each other, or the two flow paths may communicate with each other to form a meandering flow path.

The flow path 188 of the two flow paths, which is disposed at the downstream side, communicates with cooling holes 189. The plurality of cooling holes 189 may be disposed at a trailing edge TE and allow the cooling air supplied from the cooling airflow path 188 to cool the trailing edge. Because a width of the trailing edge in the circumferential direction decreases toward the downstream side to improve aerodynamic performance, a diameter of the cooling hole 189 is also restricted. For this reason, there is a constraint on improving the performance in cooling the trailing edge.

Figure 3:
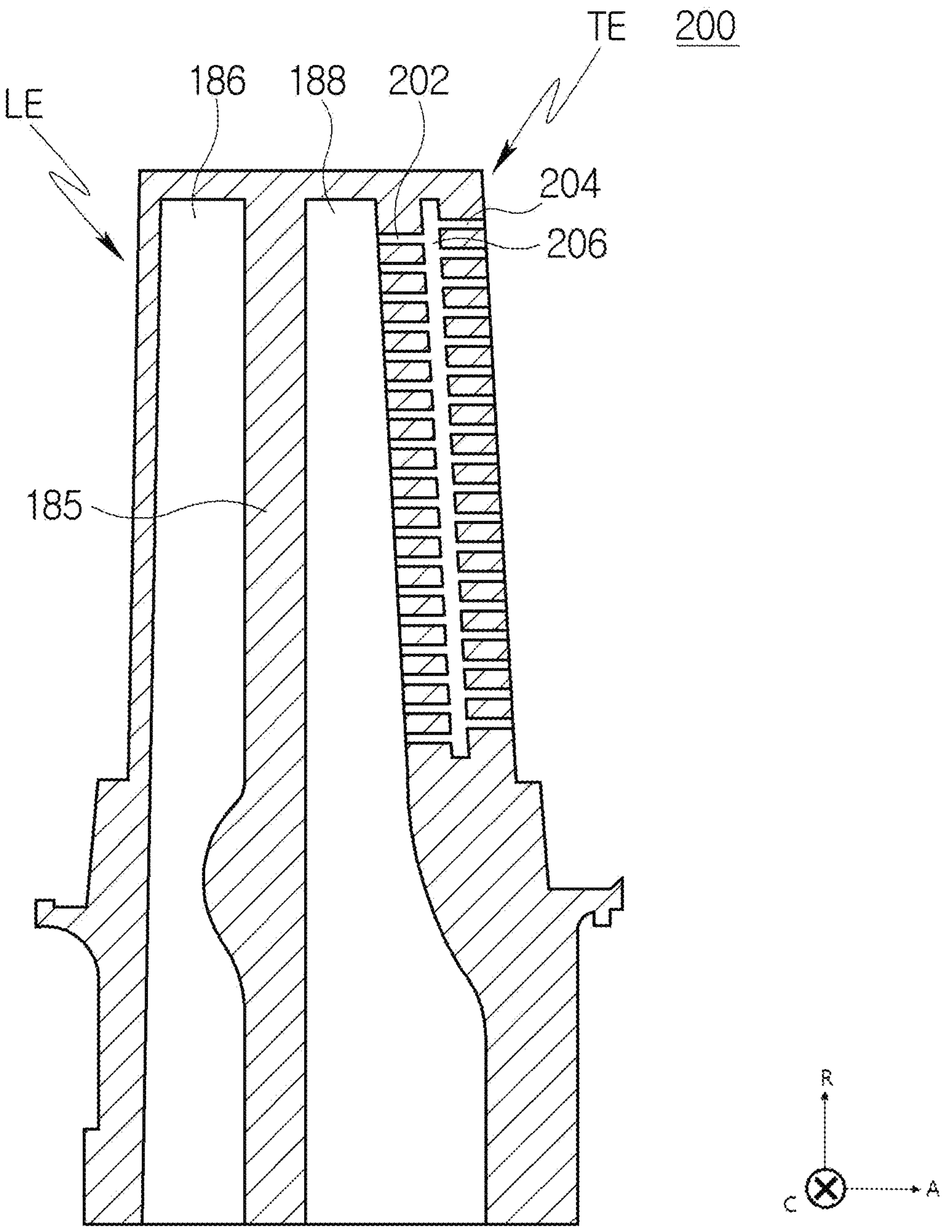
FIG. 3 is a cross-sectional view illustrating an interior of a blade according to an embodiment of the present invention.

FIG. 3 illustrates a blade 200 having a cooling structure according to an embodiment of the present invention to cope with the constraint. For convenience of description, components of the blade 200, which are identical to those in FIG. 2, will be denoted by the identical reference numerals, and a repeated description thereof will be omitted.

In FIG. 3, cooling flow paths, which have shapes known in the related art, may be adopted as the cooling airflow paths 186 and 188. The cooling airflow path 188, which is disposed at the downstream side, at least communicates with inflow paths 202 provided in the trailing edge TE.

The inflow paths 202 are disposed in the trailing edge TE. The inflow paths 202 are elongated in the flow direction of the working fluid. The flow direction of the working fluid may be referred to as an axial direction A of the gas turbine, or simply an axial direction A. The plurality of inflow paths 202 may be parallel to each other and disposed side by side in a radial direction R of the blade (corresponding to an upward/downward direction in FIG. 3). Therefore, the plurality of inflow paths 202 may be independently receive the cooling air through the cooling airflow path 188.

The inflow path 202 may be formed to have a long cylindrical shape having a circular cross-sectional shape with a small diameter. However, a cross-sectional shape of the inflow path 202 is not necessarily limited to a circular shape. The inflow path 202 may have any shape that provides a space in which the cooling air may flow.

Outflow paths 204 are provided to correspond to the respective inflow paths 202. The outflow paths 204 may be parallel to the inflow paths 202. The plurality of outflow paths 204 may be parallel to each other and disposed side by side in the radial direction R of the blade. According to an embodiment, the outflow path 204 may have a cylindrical shape identical to the shape of the inflow path 202. However, the outflow path 204 and the inflow path 202 need not necessarily have the same shape. That is, the inflow path 202 and the outflow path 204 may have different cross-sectional shapes and different lengths. The inflow paths 202 and the outflow paths 204 may be different in their numbers and/or in their diameters.

In FIG. 3, a downstream side (hereinafter, referred to as a 'discharge portion') of the outflow path 204 is disposed to extend to a surface of the blade. Therefore, the cooling air introduced into the outflow paths 204 may be discharged to the outside of the blade.

The inflow path and the outflow path communicate with each other through the communication chamber 206, which is located between the two. As illustrated in FIG. 3, the communication chamber 206 extends in the radial direction R of the blade body portion 185, and the inflow paths 202 and the outflow paths 204 are connected to two opposite sides of the communication chamber 206. Therefore, the cooling air introduced through the inflow paths 202 is introduced into the communication chamber 206 and then discharged through the outflow paths 204.

The communication chamber 206 may be formed to have a column shape elongated in the radial direction R. The communication chamber 206 may be formed to communicate exclusively with the inflow paths 202 and the outflow paths 204. That is, an outward end and an inward end of the communication chamber 206 in the radial direction R may be closed. The inward end of the communication chamber 206 may be positioned relatively more outward than the platform of the blade 200 in the radial direction R.

The cross-section of the communication chamber 206, which is perpendicular to the radial direction R, may be approximately rectangular shape. However, the cross-section is not necessarily limited to the rectangular shape. The cross-section of the communication chamber 206 may have a circular shape, half circular shape, or any polygonal shape.

In addition, FIG. 3 illustrates an example of when a single communication chamber 206 is disposed in the radial direction from an outward end to an inward end in the radial direction R. However, a plurality of communication chambers 206 may be serially disposed in the radial direction R.

Figure 4:
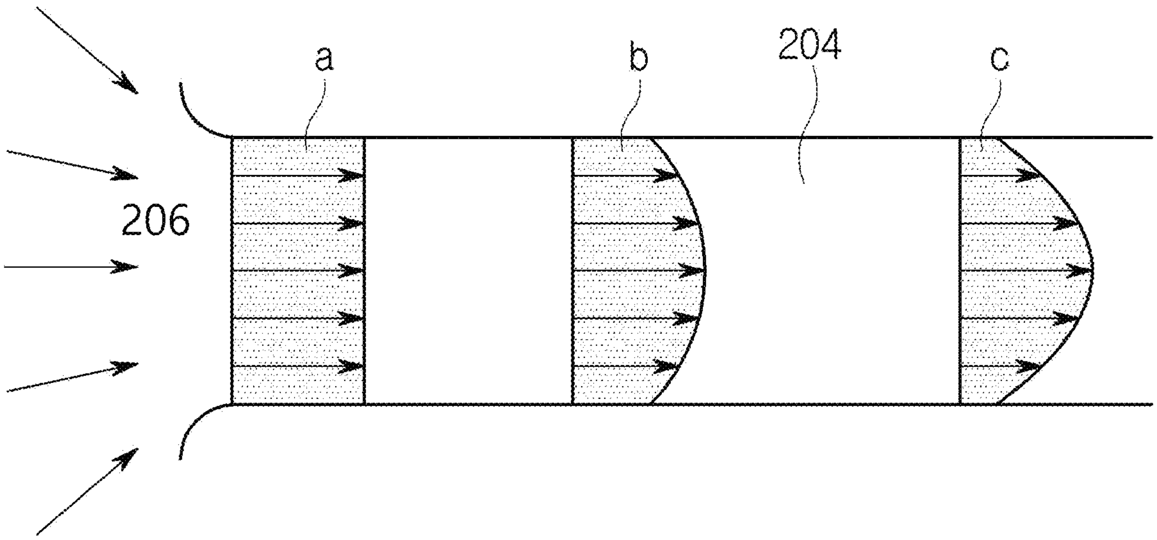
FIG. 4 is a schematic view schematically illustrating an airflow in a communication chamber of the embodiment.
Figure 5:
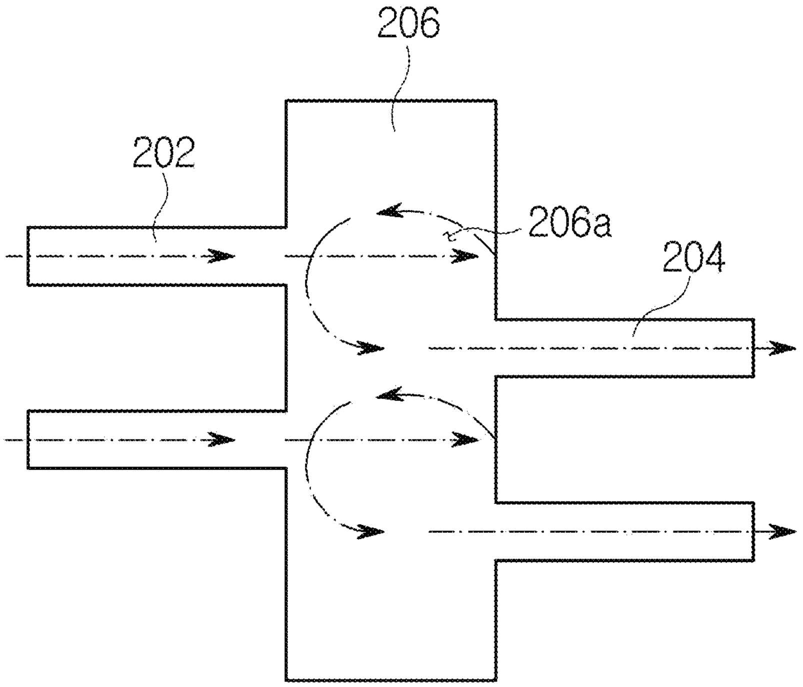
FIG. 5 is a schematic view schematically illustrating an airflow in an outflow path.

According to an embodiment, the inflow path 202 and the outflow path 204 may be disposed to be offset (i.e., spaced apart) in the radial direction with the communication chamber 206 interposed therebetween. That is, as illustrated in FIGS. 4 and 5, it can be seen that the centerline of the outflow path 204, which corresponds to an inflow path 202, is disposed to relatively more downward (i.e., inward) from the centerline of the inflow path 202 in the radial direction R. Therefore, the cooling air discharged into the communication chamber 206 from the inflow paths 202 is not immediately discharged into the outflow paths 204. Instead, the cooling air from the inflow paths 202 collides with wall surfaces of the communication chamber 206 in spaces **206*a* adjacent to the outflow paths 204 in the communication chamber 206 and then circulates in the communication chamber 206, and then the cooling air is discharged into the outflow paths 204**.

Therefore, so-called collision cooling is performed in the spaces **206*a*, which increases a heat transfer coefficient and improves heat transfer performance. The cooling air introduced into the outflow path 204 experiences an inlet effect in an inlet portion of the outflow path 204. That is, as illustrated in FIGS. 4 and 5, in case that air flows from a wide space (the space 206*a* in the communication chamber 206) to a narrow space (the inlet portion of outflow path 204**), a boundary layer (i.e., peripheral portions) of the flow is broken in the inlet portion, and the air collides with the wall surface, such that the heat transfer coefficient is also increased.

Therefore, the collision cooling in the communication chamber 206 and the inlet effect in the inlet portion of the outflow path 204 greatly improve the heat transfer performance in comparison with a simple cooling flow path in the related art, which is simply straight forward from the cooling airflow path 188 to an outside of the blade.

Figure 6:
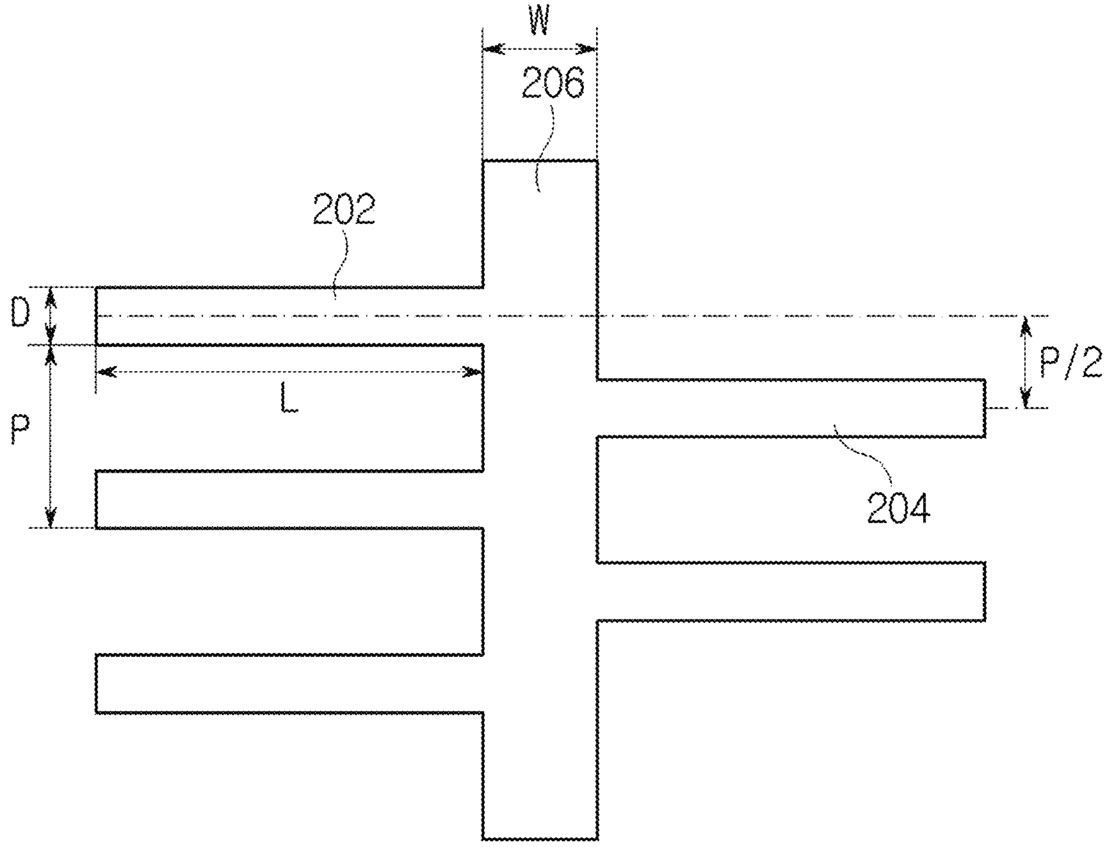
FIG. 6 is a cross-sectional view for explaining an internal dimension of the embodiment.

According to an embodiment, the cooling flow path structure may be configured to have specific dimensions to maximize the heat transfer performance and colling efficiency as illustrated in FIG. 6. That is, a diameter D of the inflow path 202 preferably may be within a range of 0.7 to 1.5 mm. This represents a numerical dimension that ensures optimal ease of machining and superior cooling performance. The remaining dimensions may be determined as follows based on the diameter D.

Axial length L of inflow path may be preferably within 5D to 15D.

Axial width W of communication chamber may be preferably within 1D to 3D.

Pitch P between inflow paths may be preferably within 2D to 5D.

Circumferential width of the communication chamber 206 may be equal to or larger than D.

According to an embodiment, the width W may be preferably larger than D (i.e., a minimum size capable of implementing a shape), and may be preferably smaller than 3D. If the width W is equal to or larger than 3D, the advantageous effect of the high heat transfer coefficient implemented by the collision begins to decrease. Further, a radial distance between a centerline of the inflow path and a centerline of the outflow path, i.e., an offset distance may be set to a value half the pitch P between the inflow paths.

However, these numerical values may vary depending on usage conditions and environments of the gas turbine using the unique system of the inflow path 202, the communication chamber 206 and the outflow path 204 according to the present disclosure. According to an embodiment in FIG. 6, the inflow path 202 and the outflow path 204 are positioned offset in the radial direction so as not to overlap each other when viewed in the axial direction at all. However, according to an embodiment, the inflow path 202 and the outflow path 204 may partially overlap each other when viewed in the axial direction. In such embodiment, a part of the cooling air discharged from the inflow paths 202 may be immediately discharged into the outflow paths 204 without colliding with the inner wall of the communication chamber.

A degree to which the two flow paths overlap each other may be easily adjusted by those skilled in the art in consideration of a degree to which a pressure loss is increased by the offset. Therefore, a specific numerical value thereof for overlap will not be described in the present specification.

Figure 7:
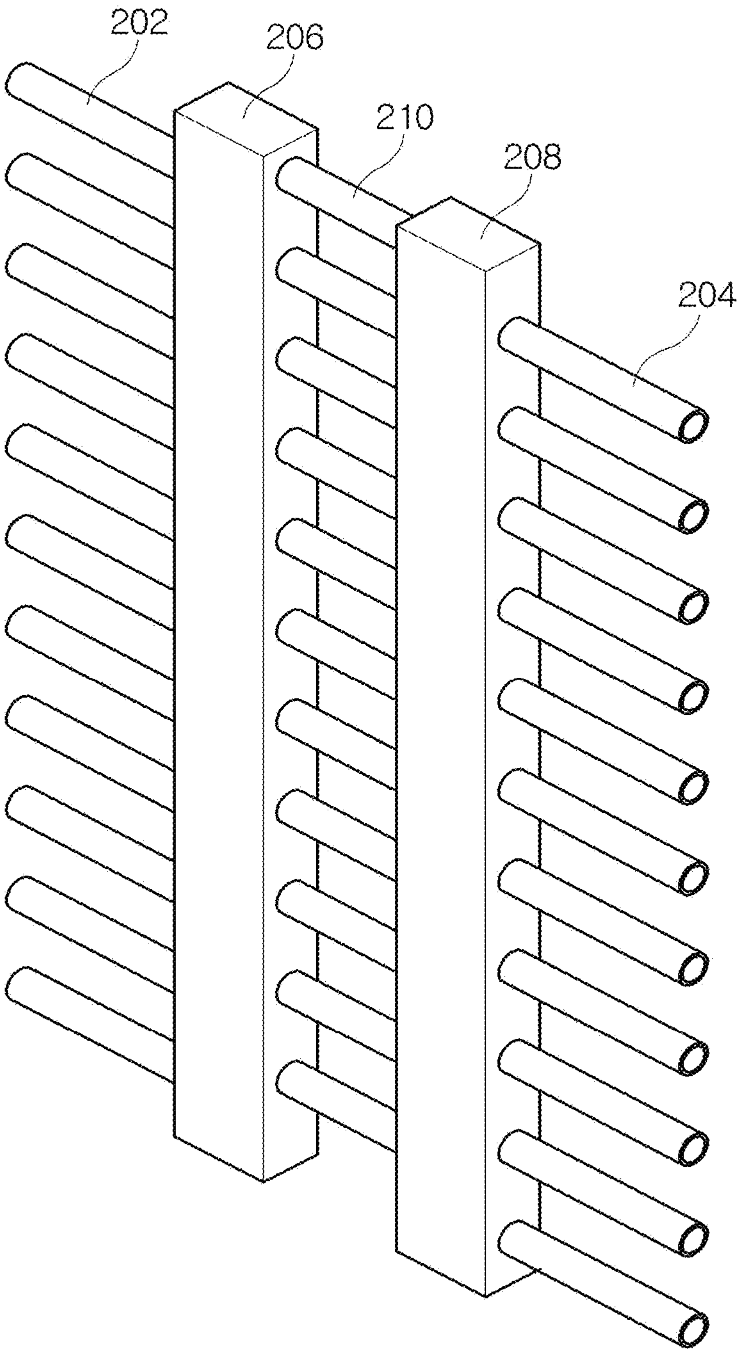
FIG. 7 is a perspective view illustrating a modified example of an internal flow path structure of the embodiment.

Meanwhile, the single communication chamber 206 is provided in the embodiment illustrated in FIG. 3, but the present invention is not necessarily limited thereto. FIG. 7 illustrates a modified example having two communication chambers.

In the modified example, the inflow path 202 and the outflow path 204 are identical to those in the embodiment illustrated in FIG. 3, and a communication chamber 208 is added in addition to the communication chamber 206. Hereinafter, for convenience of description, the two communication chambers are referred to as first and second communication chambers 206 and 208.

The second communication chamber 208 is illustrated as having the same shape as the first communication chamber 206, but the present invention is not necessarily limited thereto. The first and second communication chambers 206 and 208 may have different shapes or different volumes. For example, the second communication chamber 208 may have a smaller axial width W than the first communication chamber 206.

The first and second communication chambers 206 and 208 communicate with each other through intermediate flow paths 210. The intermediate flow path 210 may have the same shape as the inflow path or the outflow path. The intermediate flow paths 210 allow the cooling air to flow between the communication chambers 206 and 208. Further, the inflow path 202 and the intermediate flow path 210 are offset in the radial direction, and the intermediate flow path 210 and the outflow path 204 are also offset in the same way.

For the convenience of description, for an embodiment of FIG. 7, the first communication chamber 206 and the second communication chamber 208 may be referred to as, alternatively, a communication chamber 206 and an auxiliary communication chamber 208. Similarly, in FIG. 7, the intermediate flow path 210 and the outflow path 204 may be referred to as, alternatively, the outflow path 210 and auxiliary outflow path 204. When described in this manner, the embodiment in FIG. 7 may be described as that the inflow path 202 and the outflow path 210 are positioned offset in the radial direction, and the outflow path 210 and the auxiliary outflow path 204 are positioned offset in the radial direction.

Therefore, two collision cooling/inlet effects may be obtained, which may improve the heat transfer performance.

Figures 8A, 8B, 8C, 8D:
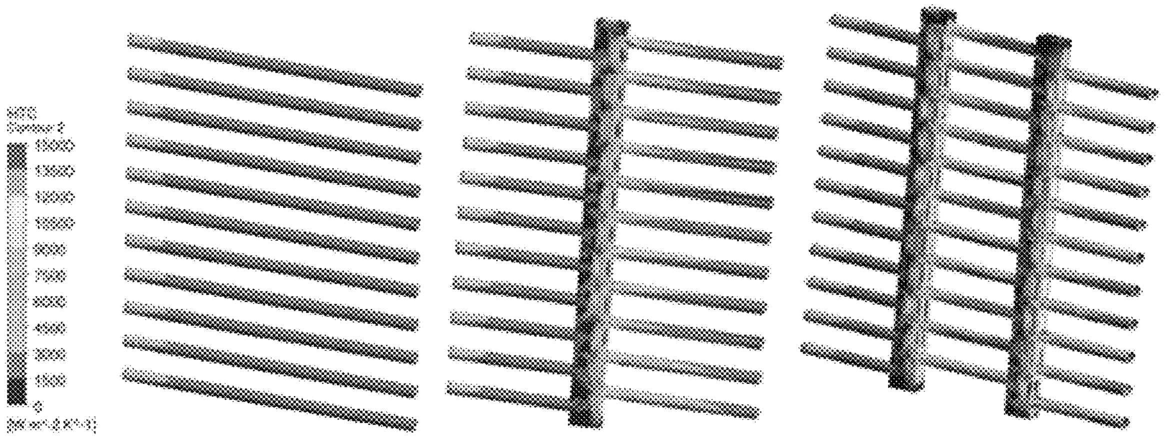
FIGS. 8(*a*)-8(*d*) are graphs illustrating a result of measuring heat transfer coefficients in the embodiment and the modified example.

FIGS. 8(*a*)-8(*d*) are graphs illustrating results of measuring heat transfer coefficients related to cooling holes in the related art, the embodiment in FIG. 3, and the embodiment in FIG. 7. With reference to graph (b) illustrating the heat transfer coefficient related to the cooling holes in the related art, it can be seen that the heat transfer coefficient is entirely low in the cooling holes having constant shapes.

With reference to graph (c) related to the embodiment illustrated in FIG. 3, the heat transfer coefficient is highest in the vicinity of a collision surface (i.e., wall surface) in the communication chamber, and the increased heat transfer coefficient gradually decreases toward the downstream side along the outflow path. That is, it can be seen that the heat transfer coefficient is increased in the vicinity of the collision surface by the collision cooling, and it is understood that the increased numerical value of the heat transfer coefficient is maintained to some extent by the inlet effect without being rapidly decreased while cooling air entering and flowing in the outflow path.

With reference to graph (d) related to the embodiment illustrated in FIG. 7, it can be seen that the heat transfer coefficient is increased once again in the same manner in the second communication chamber.

Figure 9:
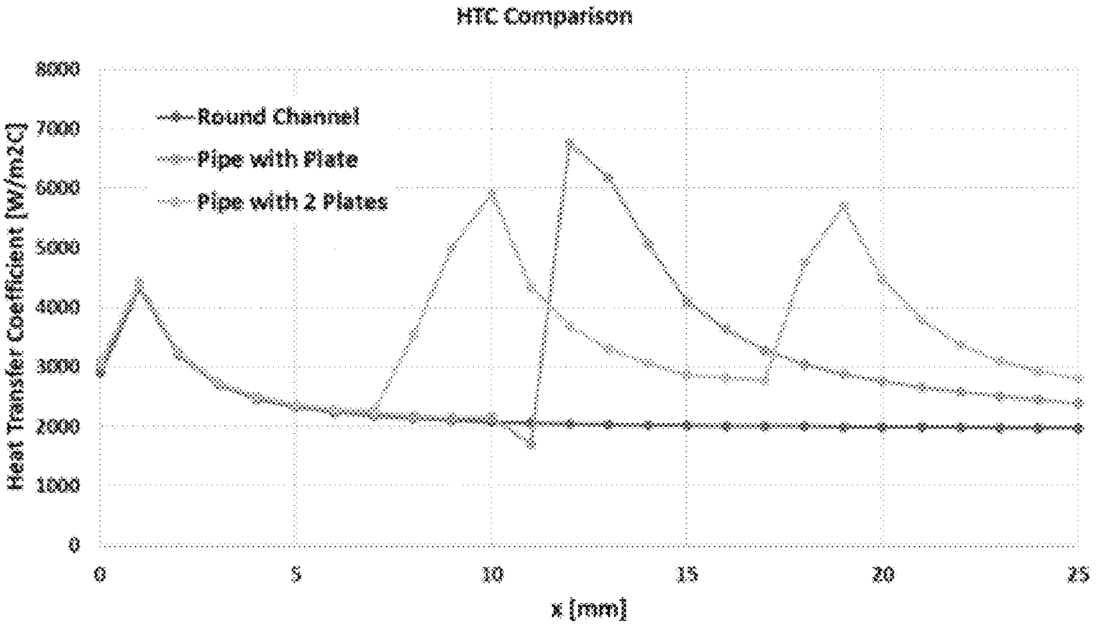
FIG. 9 is a graph illustrating changes in heat transfer coefficients in an axial direction in the embodiment and the modified example.

With reference to the graph illustrated in FIG. 9, the extent of the increase in heat transfer coefficient is further clarified. Assuming that an area below the graph is heat transfer performance, it can be seen that the embodiment in FIG. 7 having the two communication chambers exhibits the best heat transfer performance (i.e., the graph of "Pipe with 2 Plates"). The measured heat transfer coefficients shown in FIG. 9 are summarized in Table 1 below.

TABLE 1

| | Average value of heat transfer coefficient | Increase rate |
|---|---|---|
| Cooling hole | 2256 | |
| Embodiment in FIG. 3 | 3121 | 38.3% |
| Embodiment in FIG. 7 | 3506 | 55.4% |

Figure 10:
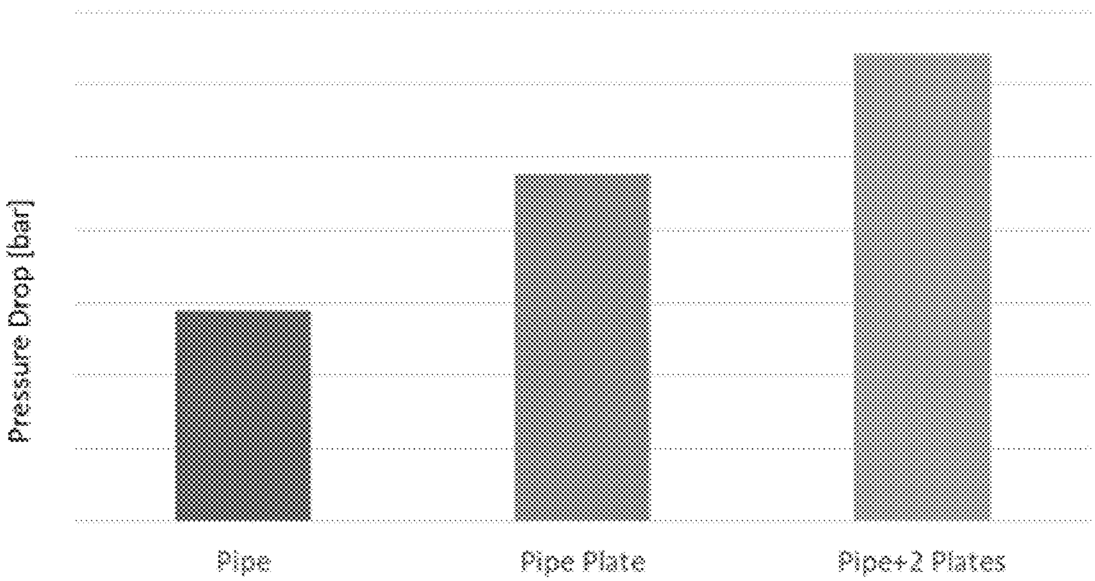
FIG. 10 is a graph illustrating a result of measuring pressure losses in the embodiment and the modified example.

However, it should be noted that a pressure loss increases with the increase in heat transfer coefficient. As illustrated in FIG. 10, it can be seen that the case with having more communication channels leads to a higher pressure loss compared to the case with the single communication channel. Therefore, a better effect may be obtained when the two communication channels are applied to a configuration having a sufficient pressure margin. Because the trailing edge of the blade generally has many pressure margins, the two communication channels may be sufficiently applied.

Figure 11:
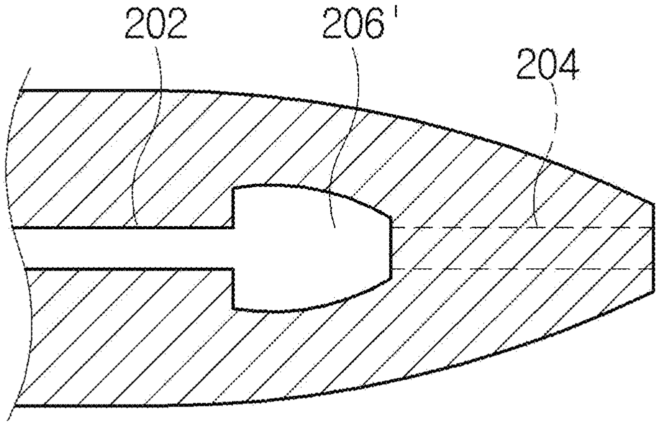
FIG. 11 is a cross-sectional view illustrating a modified example of the communication chamber of the embodiment.

Meanwhile, a cross-sectional shape of the communication channel may vary to other shapes according to embodiments. The cross-sectional shape of the communication channel means a cross-section perpendicular to a radial direction. FIG. 11 illustrates a modified example of the communication channel having a different cross-sectional shape. With reference to FIG. 11, a communication channel 206' may have a tapered shape having a width, defined in the circumferential direction, that gradually decreases in the axial direction (a leftward/rightward direction in FIG. 11). Specifically, the width of the communication channel 206' in the circumferential direction at its upstream end may be larger than the diameter of the inflow path 202. Then, the width of the communication channel 206' gradually decreases. According to an embodiment, the width of the communication channel 206' may become same, at its downstream end, as the one of the outflow path 204. According to an embodiment, the width of the communication channel 206' may remain constant for a predetermined axial direction before decreasing toward the downstream direction.

In this case, the collision cooling performance may decrease as the collision surface decreases. However, a pressure loss may be reduced, which may compensate for the decreased collision cooling performance. Therefore, the modified example may be applied to a configuration in which the pressure margin is not large.

According to the present invention configured as described above, the cooling air from inflow path is introduced into the communication chamber and collides with the inner wall of the communication chamber, without being immediately discharged through the outflow paths, such that the cooling effect implemented by the collision cooling may be further achieved. Further, after the collision, the cooling air generates turbulent flows at the inlet portion of the outflow paths while being discharged through the outflow paths. The turbulent flows at the inlet sides further facilitate heat transfer, thereby obtaining higher cooling performance at the same cooling airflow rate in comparison with the related art.

It is noted that a person having an ordinary skill in this art understands that any one feature of an embodiment of the present disclosure described in the specification may be applied to another embodiment of the present disclosure. Similarly, the present invention encompasses any embodiment that combines features of one embodiment and features of another embodiment.

What is claimed is:

1. A blade for a gas turbine, the blade comprising:

a blade body portion having a leading edge and a trailing edge respectively disposed at an upstream side and a downstream side based on a flow direction of a working fluid;

a cooling airflow path disposed in the blade body portion and configured to provide a flow path for cooling air;

inflow paths configured to communicate with the cooling airflow path;

outflow paths through which the cooling air is injected toward the trailing edge; and a communication chamber, located between the inflow paths and the outflow paths, configured to allow communication between the inflow paths and the outflow paths, wherein the inflow paths and the outflow paths are positioned offset in a radial direction of the blade body portion, wherein, when a diameter of each of the inflow paths is D, the axial width of the communication chamber W is defined as following:

$$1D \le W \le 3D.$$

2. The blade of claim 1, wherein the communication chamber extends in the radial direction of the blade body portion, and the inflow paths and the outflow paths communicate with the communication chamber.

3. The blade of claim 2, wherein the inflow paths are configured to exclusively receive the cooling air from the cooling airflow path.

4. The blade of claim 1, wherein, when the flow direction of the working fluid is along an axial direction of the gas turbine, the inflow paths and the outflow paths are positioned offset in the radial direction so as not to overlap each other when viewed in an axial direction of the gas turbine.

5. The blade of claim 1, further comprising:

an auxiliary communication chamber located downstream of and connected to the outflow paths; and auxiliary outflow paths, located downstream of and connected to the auxiliary communication chamber, configured to inject cooling air toward the trailing edge, wherein the outflow paths are configured to allow the communication chamber and the auxiliary communication chamber to communicate with one another.

6. The blade of claim 5, wherein the outflow paths and the auxiliary outflow paths are positioned offset in the radial direction of the blade body.

7. The blade of claim 1, wherein when the flow direction of the working fluid is along an axial direction of the gas turbine, the communication chamber has a constant width, defined in a circumferential direction, constant along the flow direction of the working fluid.

8. The blade of claim 1, wherein, when the flow direction of the working fluid is along an axial direction of the gas turbine, the communication chamber has a tapered shape having a width, defined in a circumferential direction, that decreases along the flow direction of the working fluid.

9. The blade of claim 1, wherein the inflow paths and the outflow paths are positioned offset in the radial direction so that at least a portion of the cooling air injected from the inflow paths collides with a wall surface of the communication chamber, and then is discharged into the outflow paths from the communication chamber.

10. A rotor for a gas turbine, the rotor comprising:

rotor discs fixed to a rotary shaft of the gas turbine; and blades radially inserted into outer peripheral portions of the rotor discs, wherein each of the blades comprises:

a blade body portion having a leading edge and a trailing edge respectively disposed at an upstream side and a downstream side based on a flow direction of a working fluid;

a cooling airflow path disposed in the blade body portion and configured to provide a flow path for cooling air;

inflow paths configured to communicate with the cooling airflow path;

outflow paths through which the cooling air is injected toward the trailing edge; and a communication chamber, located between the inflow paths and the outflow paths, configured to allow communication between the inflow paths and the outflow paths, wherein the inflow paths and the outflow paths are positioned offset in a radial direction of the blade body portion, wherein, when a diameter of each of the inflow paths is D, the axial width of the communication chamber W is defined as following:

$$1D \le W \le 3D.$$

11. The rotor of claim 10, wherein the communication chamber extends in the radial direction of the blade body portion, and the inflow paths and the outflow paths communicate with the communication chamber.

12. The rotor of claim 11, wherein the inflow paths are configured to exclusively receive the cooling air from the cooling airflow path.

13. The rotor of claim 10, wherein, when the flow direction of the working fluid is along an axial direction of the gas turbine, the inflow paths and the outflow paths are positioned offset in the radial direction so as not to overlap each other when viewed in an axial direction of the gas turbine.

14. The rotor of claim 10, further comprising:

an auxiliary communication chamber located downstream of and connected to the outflow paths; and auxiliary outflow paths, located downstream of and connected to the auxiliary communication chamber, configured to inject cooling air toward the trailing edge, wherein the outflow paths are configured to allow the communication chamber and the auxiliary communication chamber to communicate with one another.

15. The rotor of claim 14, wherein the outflow paths and the auxiliary outflow paths are positioned offset in the radial direction of the blade body.

16. The rotor of claim 10, wherein the inflow paths and the outflow paths are positioned offset in the radial direction so that at least a portion of the cooling air injected from the inflow paths collides with a wall surface of the communication chamber, and then is discharged into the outflow paths from the communication chamber.

17. A gas turbine comprising:

a housing;

a compressor section disposed at an upstream side in the housing;

a turbine section disposed at a downstream side in the housing; and a combustor configured to combust a gas mixture of compressed air and fuel supplied from the compressor section and supply the combustion gas to the turbine section, wherein at least one of the compressor section and the turbine section comprises the plurality of rotors, each of the plurality of rotors being a rotor according to claim 11.

18. The gas turbine of claim 17, wherein the communication chamber extends in the radial direction of the blade body portion, and the inflow paths and the outflow paths communicate with the communication chamber.

19. The gas turbine of claim 18, wherein the inflow paths and the outflow paths are positioned offset in the radial direction so that at least a portion of the cooling air injected from the inflow paths collides with a wall surface of the communication chamber, and then is discharged into the outflow paths from the communication chamber.

* * * * *